(12) United States Patent
Fellenstein et al.

(10) Patent No.: US 7,523,498 B2
(45) Date of Patent: Apr. 21, 2009

(54) METHOD AND SYSTEM FOR MONITORING PERSONAL COMPUTER DOCUMENTS FOR SENSITIVE DATA

(75) Inventors: Craig William Fellenstein, Brookfield, CT (US); Rick Allen Hamilton, Charlottesville, VA (US); James Wesley Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 694 days.

(21) Appl. No.: 10/850,404

(22) Filed: May 20, 2004

(65) Prior Publication Data
US 2005/0262557 A1 Nov. 24, 2005

(51) Int. Cl.
*H04L 9/32* (2006.01)

(52) U.S. Cl. .................. 726/22; 726/26; 713/188; 714/143; 714/144

(58) Field of Classification Search ............. 726/26–30, 726/22; 713/188
See application file for complete search history.

(56) References Cited

U.S. PATENT DOCUMENTS

| | | | | |
|---|---|---|---|---|
| 5,508,690 A * | 4/1996 | Shur et al. | ................. | 340/505 |
| 5,848,412 A | 12/1998 | Rowland et al. | | |
| 5,864,875 A * | 1/1999 | Van Huben et al. | ......... | 707/200 |
| 5,867,651 A | 2/1999 | Dan et al. | | |
| 5,878,384 A | 3/1999 | Johnson et al. | | |
| 6,085,224 A * | 7/2000 | Wagner | ....................... | 709/203 |
| 6,088,803 A * | 7/2000 | Tso et al. | ....................... | 726/22 |
| 6,229,731 B1 * | 5/2001 | Kasai et al. | ............. | 365/185.04 |
| 6,260,059 B1 | 7/2001 | Ueno et al. | | |
| 6,292,898 B1 * | 9/2001 | Sutherland | ................... | 726/34 |
| 6,332,156 B1 | 12/2001 | Cho et al. | | |
| 6,381,654 B1 | 4/2002 | Brawn et al. | | |
| 7,152,244 B2 * | 12/2006 | Toomey | ....................... | 726/26 |
| 7,272,853 B2 * | 9/2007 | Goodman et al. | ............ | 726/13 |
| 7,349,987 B2 * | 3/2008 | Redlich et al. | ................ | 726/26 |
| 2001/0033657 A1 * | 10/2001 | Lipton et al. | ................ | 380/201 |
| 2001/0056546 A1 * | 12/2001 | Ogilvie | ........................ | 713/200 |
| 2002/0116641 A1 * | 8/2002 | Mastrianni | .................. | 713/201 |
| 2003/0023873 A1 * | 1/2003 | Ben-Itzhak | ................ | 713/201 |
| 2003/0145218 A1 * | 7/2003 | Hutchison | ................... | 713/200 |
| 2003/0200459 A1 * | 10/2003 | Seeman | ...................... | 713/200 |
| 2004/0064724 A1 * | 4/2004 | Himmel et al. | ............. | 713/201 |

OTHER PUBLICATIONS (Proposed Amendment for Discussion sent to Examiner from Carr, LLP on Sep. 6, 2007—4 pages).*

* cited by examiner

*Primary Examiner*—Kambiz Zand
*Assistant Examiner*—Amare Tabor
(74) *Attorney, Agent, or Firm*—Carr LLP

(57) ABSTRACT

An apparatus, a method, and a computer program are provided for securing transmitted text. Once text has been produced by an application, the potential exists for an unintended third party to obtain sensitive data transmitted over computer networks. However, a parsing function can then operate either on an individual computer or on a network to scan text at an Open Systems Interconnection (OSI) Layer 1 to assist in the prevention of sensitive data transmission. By utilizing the parsing function, text can be scanned for potentially sensitive data by using a variety of techniques, such as a learning algorithm. The sensitive data can then be verified by a user, bypassed, or autostripped.

6 Claims, 4 Drawing Sheets

METHOD AND SYSTEM FOR MONITORING PERSONAL COMPUTER DOCUMENTS FOR SENSITIVE DATA

FIELD OF THE INVENTION

The present invention relates generally to monitoring sensitive data on a computer system and, more particularly, to document scanning on a computer network to prevent secure data transfer to unauthorized parties.

DESCRIPTION OF THE RELATED ART

Computers have become a ubiquitous element of modern society. Infrastructures and computer networks, such as the Internet, have been developed to better utilize computer resources and improve commerce. Included with the increased usage of computer networks is the electronic transmission of data that may be sensitive, such as social security numbers.

A problem with transmission, though, is security. Prying eyes may either harmlessly or maliciously obtain sensitive data. As a result, many in the computer industry have implemented many simple and complex security schemes to protect sensitive data from unauthorized users. For example, data encryption has become a keystone to network security, where public and private keys are used to decrypt data.

However, employing various, and possibly complex, encryption techniques, such as authentication, is neither foolproof nor impenetrable. A user must remember that security protocols utilized in data transmission only delay access. Implemented security protocols, such as 512 bit encryption, can be broken. Given enough desire and time, sensitive data can potentially be decrypted. However, the security protocols are employed to deter access because of the time and effort required for only very small returns on the resources allocated to obtain the sensitive data.

Also, not all sensitive data is encrypted. A notorious service that does not typically encrypt data is email. Email is not secure, and oftentimes, people do not take a second thought of transmitting sensitive data through email, relying on a false sense of security.

A good way to prevent third party users from obtaining sensitive data is to not transmit the data. Not transmitting sensitive data, though, is an unrealistic expectation. Instead, reducing the number of incidences of sensitive data transmittal would be more advantageous.

Therefore, there is a need for a method and/or apparatus for assisting in the reduction of sensitive data transmittal that at least addresses some of the problems associated with convention security protocols, such as authentication.

SUMMARY OF THE INVENTION

The present invention provides a method and a computer program for electronically securing text transmitted over a computer network. Once the text is transmitted from an application, the text is scanned text generated by a parsing function at an Open Systems Interconnection (OSI) Layer 1 or Layer 3 to produce scanned text. After being scanned, a determination is made as to whether if the scanned text contains sensitive data. Once the determination is made, the scanned text is verified.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
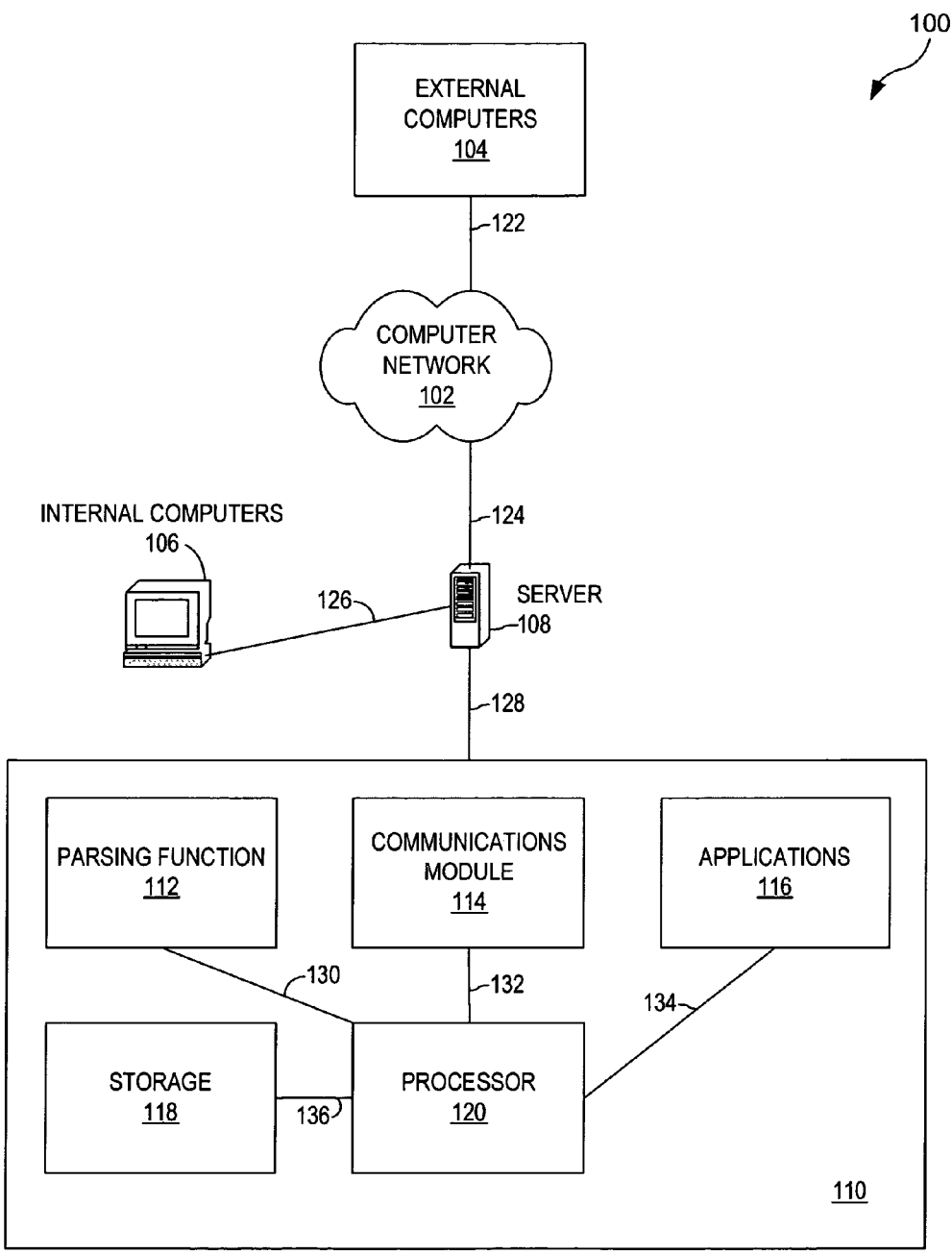
FIG. 1 is a block diagram depicting a system with a parsing function operating at Opens Systems Interconnection (OSI) Layer 1 or the application layer.

Referring to FIG. 1 of the drawings, the reference numeral 100 generally designates a block diagram depicting a system with a parsing function operating at OSI Layer 1 or the application layer. The system 100 comprises external computers 104, a computer network 102, a server 108, internal computers 106, and a modified internal computer 110.

The system 100 operates by relaying data between computers and across the computer network 102. External computers 104 are coupled to the computer network 102 through a first communication channel 122. The computer network 102 can be a variety of networks types including, but not limited to, the Internet. Coupled to the computer network 102 is an internal server 108 through a second communication channel 124. The server 108 allows internal data to be communicated with the computer network 102 and external computers 104. Other internal computers 106 and the modified computer 110 are then coupled to the server 108 through a third communication channel 126 and a fourth communication channel 128, respectively, so as to send and receive data.

The modified computer 110, though, differs from other internal computers 106 and the external computers 104 in that data transmission is more closely monitored. The modified computer 110 comprises application 116, a communications module 114, a parsing function 112, storage 118, and a processor 120. The application 116, the communications module 114, the parsing function 112, and the storage 118 are coupled to the processor 120 through a fifth communication channel 134, a sixth communication channel 132, a seventh communication channel 130, and an eighth communication channel 136. By providing the interconnections between the various components of the modified computer, better security can be maintained.

The processor 120 is an essential element for the operation of the modified computer 110. The processor 120 operates the application 116, stores data in storage 118, and communicates data to remote computers through the communications module 114. The storage 118 can be conventional storage media, such as a Hard Disk Drive, virtual memory, or some other volatile or non-volatile media. However, a user can utilize applications 116, such as email, to create and store sensitive data on in storage 118 or communicate sensitive data to remote computers utilizing the communications module 114.

Whenever data is created, stored, access, moved, or transmitted, any sensitive materials can be vulnerable. The parsing function 112, though, is employed by the processor 120 to scan documents. By utilizing a list of "hot" words, which is either defined through a lexicon, semantic interpretation or other means, the parsing function can determine if sensitive data exists in a textual representation, such as a word processor document, an email, or an instant message. The list of "hot" words can be developed using a learning algorithm or another predetermined implementation, such as lexical table. Thus, once the parsing function 112 has determined that a document possesses sensitive data and whenever a triggering event, such as moving, transmitting, accessing, and storing, occurs, a user that has oversight authority of the sensitive data is warned. Also, the parsing function 112 can be programmed to not allow the triggering event without explicit authorization, or it may be passive.

Figure 2:
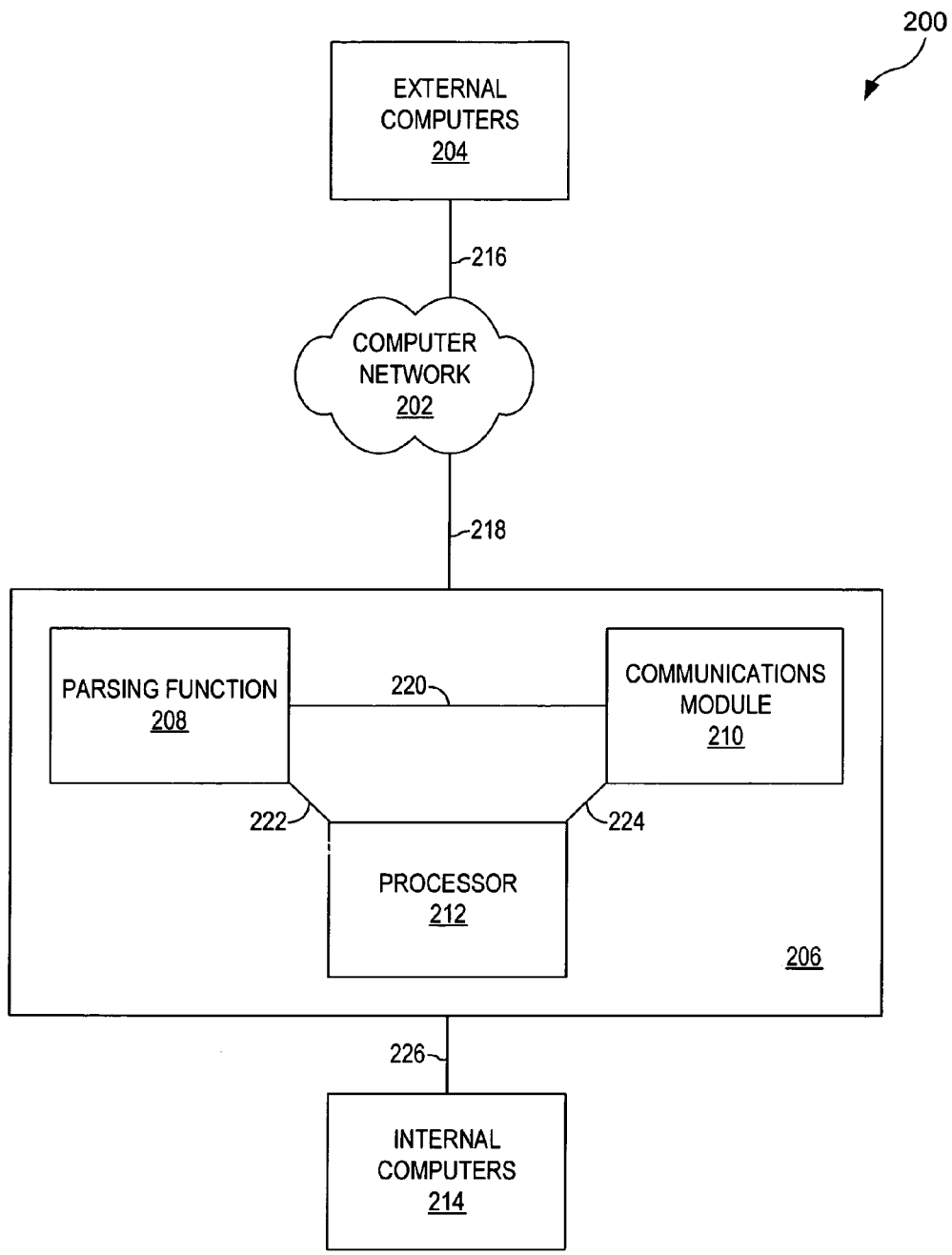
FIG. 2 is a block diagram depicting a system with a parsing function operating at OSI Layer 3 or the network layer.

Referring to FIG. 2 of the drawings, the reference numeral 200 generally designates a block diagram depicting a system with a parsing function operating at OSI Layer 3 or the network layer. The system 200 comprises external computers 204, a computer network 202, a modified server 206, and internal computers 214.

The system 200 operates by relaying data between computers and across the computer network 202. External computers 204 are coupled to the computer network 202 through a first communication channel 216. The computer network 202 can be a variety of networks types including, but not limited to, the Internet. Coupled to the computer network 202 is a modified server 206 through a second communication channel 218. The modified server 108 allows internal data to be communicated with the computer network 202 and external computers 204. Other internal computers 214 are then coupled to the modified server 208 through a third communication channel 226, so as to send and receive data.

The modified server 110, though, differs from other servers (not shown) in that data transmission is more closely monitored. The modified server 206 comprises a communications module 210, a parsing function 208, and a processor 212. The processor is coupled to the communication module 210 and the parsing function 208 through a fourth communication channel 224 and a fifth communication channel 222, and the parsing function 208 is coupled to the communications module 210 through a sixth communications channel 220. An application (not shown) can be run on internal computers 214 that would allow for transmission, access, or creation of sensitive data. By providing the interconnections between the various components of the modified server, better security can be maintained.

The processor 212 is an essential element for the operation of the modified server 206. The processor 212 oversees data transmission and access through the network. However, a user can utilize applications, such as email, to create and store sensitive data on in storage, such as storage 118, or communicate sensitive data to remote computers utilizing the communications module 210.

Whenever data is created, stored, access, moved, or transmitted over a network, any sensitive materials can be vulnerable. Data can be stored on conventional storage media, such as a Hard Disk Drive, virtual memory, or some other volatile or non-volatile media. The parsing function 208, though, is employed by the processor 212 to scan documents. When data is slated for transmission over a network, such as the computer network 202, documents and other data are converted to a packet data format. By utilizing a list of "hot" words, which is either defined through a lexicon, semantic interpretation or other means, the parsing function 208 can determine if sensitive data exists in a textual representation, such as a word processor document, an email, or an instant message. or an email, by examining transmitted packets. The list of "hot" words can be developed using a learning algorithm or another predetermined implementation, such as lexical table. Thus, once the parsing function 208 has determined that a document possesses sensitive data and whenever a triggering event, such as moving, transmitting, accessing, and storing, occurs, a user that has oversight authority of the sensitive data is warned. Also, the parsing function 208 can be programmed to not allow the triggering event without explicit authorization, or it may be passive. Moreover, for an increased layer of security the modified computer 110 of FIG. 1 can be utilized in conjunction with the modified server 206.

Figure 3:
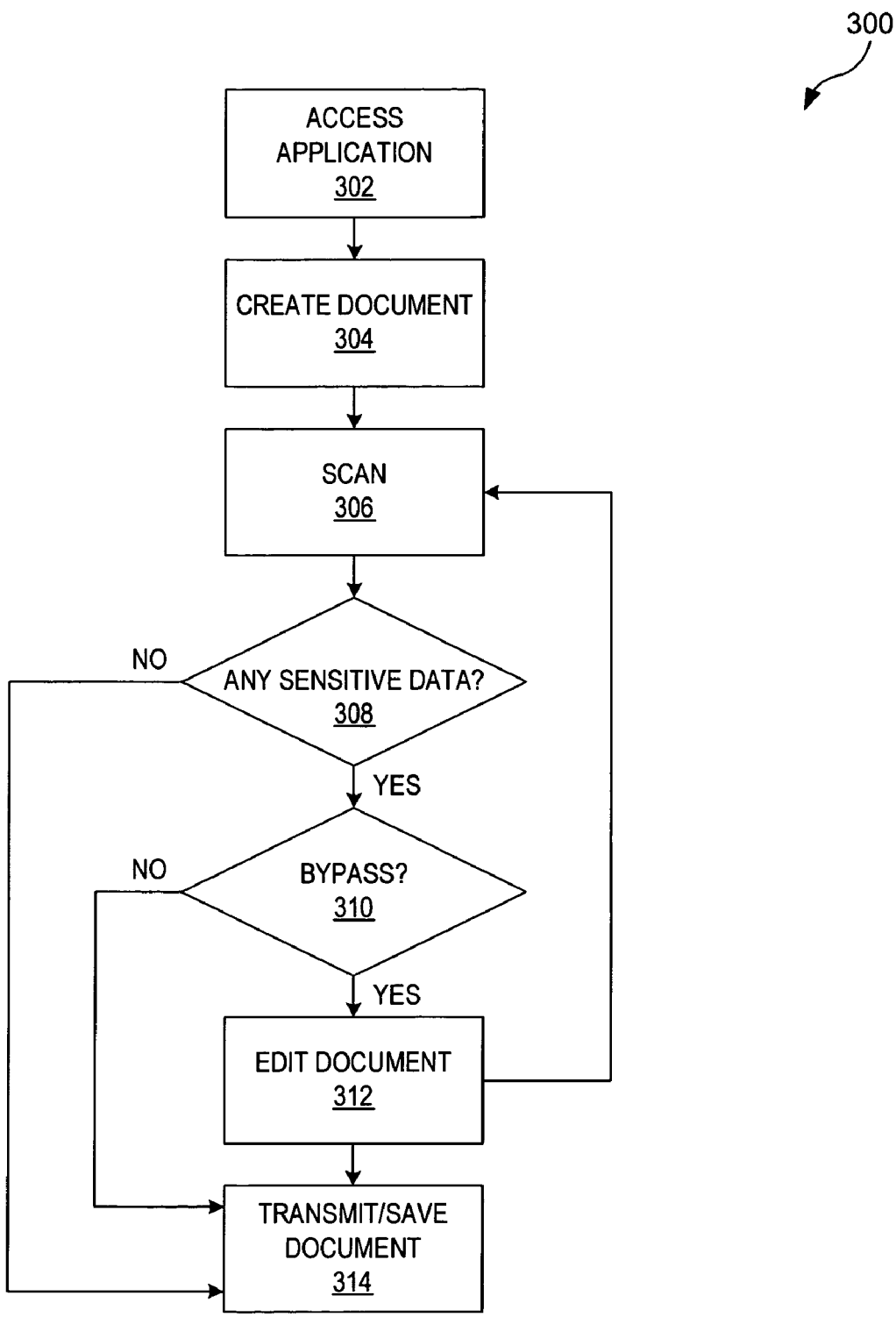
FIG. 3 is a flow chart depicting the operation at OSI layer 1 of a parsing function.

Referring to FIG. 3 of the drawings, the reference numeral 300 generally designates a flow chart depicting the operation at OSI layer 1 of a parsing function.

In order for the parsing function to operate, data must be created. In step 302, a user accesses an application, such as a word processor. There are a variety of applications that can generate documents that contain sensitive data, such as an email program and a word processor. Once the application has been accessed, then the user creates a document containing data in step 304. After the document has been created, then it can be scanned in step 306.

All documents, though, do not contain sensitive data, such as social security numbers or credit card numbers. The parsing function, such as the parsing function 112 of FIG. 1, makes a determination as to whether there is any sensitive data contained within the document in step 308. If the document contains sensitive data, then the user may bypass the safety features employed by the parsing function in step 310. From there, in step 312, a user can edit the document in order to eliminate any sensitive data and have the document rescanned in step 306. Once the document, though, has been edited or there is no sensitive data, then the document can be transmitted or saved in step 314.

Figure 4:
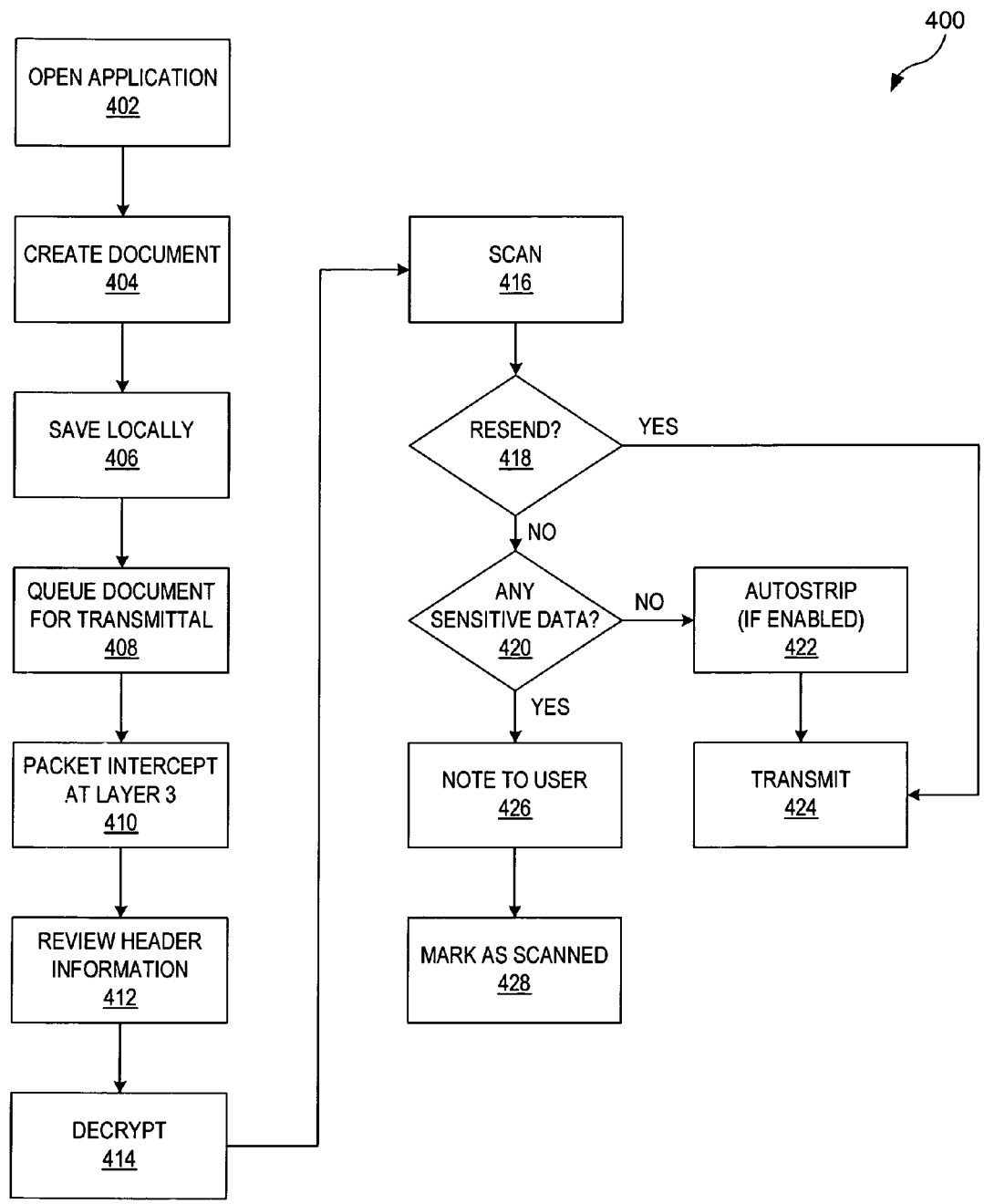
FIG. 4 is a flow chart depicting the operation at OSI layer 3 of a parsing function.

Referring to FIG. 4 of the drawings, the reference numeral 400 generally designates a flow chart depicting the operation at OSI layer 3 of a parsing function.

In order for the parsing function to operate, data must be created. In step 402, a user accesses an application, such as a word processor. There are a variety of application that can generate documents that contain sensitive data, such as an email program and a word processor. Once the application has been accessed, and then the user creates a document containing data in step 404. After the document has been created, then it can be stored locally in step 406 and queued for transmission across a network in step 408.

Once transmitted, the packets are then scanned at the network layer. A server, such as the modified server 206 of FIG. 2, intercepts the transmitted packet data in step 410. Once the data packets have been intercepted, then in step 412, the header information is reviewed so as to properly reassemble the packet data into the correct, readable form. The packets can then be decrypted, if necessary, in step 414 and scanned in step 416.

All documents, though, do not contain sensitive data, such as social security numbers or credit card numbers. If the document is a resend of a previously scanned document, then the user may bypass the safety features employed by the parsing function in step 418. However, if the document has not been previously scanned, then the parsing function, such as the parsing function 208 of FIG. 2, makes a determination as to whether there is any sensitive data contained within the document in step 420. From there, in step 426, a note can be sent to the user stating that the document contained sensitive data, and the document is marked as scanned in step 428. However, an autostrip feature can be enabled to automatically remove any detected sensitive data in step 422. Once the document, though, has been resent or autostripped of any sensitive data, then the document can be transmitted in step 424.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A method for electronically securing text transmitted over a computer network, comprising:
    scanning text generated by a parsing function at an Open Systems Interconnection (OSI) layer to provide scanned text, wherein the OSI layer is Layer 1 or Layer 3;
    determining if the scanned text contains sensitive data; and
    verifying the scanned text, wherein the step of verifying comprises:
        notifying a user of presence of the sensitive data in the scanned text, wherein the step of notifying comprises autostripping, and wherein the step of autostripping automatically deletes detected, sensitive data in the scanned text.

2. The method of claim 1, wherein the step of determining further comprises employing a semantical analyzer.

3. The method of claim 1, wherein the step of determining further comprises employing a learning algorithm.

4. The method of claim 1, wherein the step of determining further comprises employing a lexical table.

5. The method of claim 1, wherein the step of verifying further comprises:
    determining if the user bypasses, wherein the bypass at least allows a user to transmit the text generated by the at least one application.

6. The method of claim 1, further comprising the steps of:
    intercepting the text and reviewing a header information of the text; and
    reassembling the text based on the header information.

* * * * *